Figure 1:
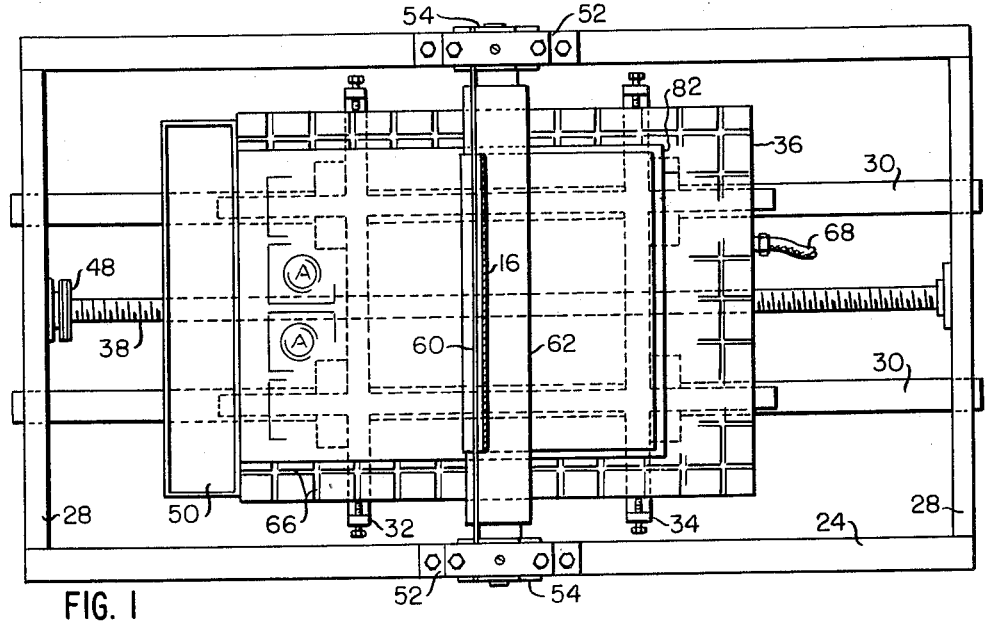

March 1, 1966  H. A. BENTZINGER  3,237,244
APPARATUS FOR MAKING PRINTING PLATES
Filed March 4, 1965  3 Sheets-Sheet 1

INVENTOR.
HARLAN A. BENTZINGER
BY
ATTORNEYS

March 1, 1966  H. A. BENTZINGER  3,237,244
APPARATUS FOR MAKING PRINTING PLATES
Filed March 4, 1965  3 Sheets-Sheet 2

INVENTOR.
HARLAN A. BENTZINGER
BY
ATTORNEYS

INVENTOR
HARLAN A. BENTZINGER
BY,
ATTORNEYS 3,237,244
APPARATUS FOR MAKING PRINTING PLATES
Harlan A. Bentzinger, Wayland, Mass., assignor to Chemical Products Corporation, East Providence, R.I., a corporation of Rhode Island
Filed Mar. 4, 1965, Ser. No. 440,670
6 Claims. (Cl. 18—5)

This application is a continuation-in-part of my parent application Serial No. 234,787, filed November 1, 1962.

The present invention relates generally to the manufacture of plastic relief and gravure printing plates. The printing surface for such plates is formed by casting a hardenable liquid plastic on to a reverse image matrix. A typical matrix may be composed of thermosetting resin such as phenol-formaldehyde or the like, as commonly used in the trade for making electrotype plates. More particularly, this invention comprises an apparatus utilizing such a matrix for casting and assembling a flexible plastic printing plate of accurate gauge.

The copending application of De Maria, Hogan and Pearson Serial No. 46,815, filed August 1, 1960, and having a common assignee, discloses a process for casting a heat hardenable liquid facing composition upon the face of a matrix, spreading the liquid uniformly over the matrix surface with a doctor blade, applying a preformed composite thermoplastic sheet of backing material to the liquid, heating the assembly to solidify the facing and soften the backing to cause its adhesion to the facing, and compressing the heated assembly in a press until cool to impart an accurate thickness to the finished plate. The process is described as applied to plates formed with backing and facing layers formulated of plastisol, which is a dispersion of powdered vinyl chloride resin polymers or copolymers thereof in liquid plasticizer. This material is characterized by the property that upon heating to the "fusing" temperature it enters the solid phase with substantially no dimensional change due to the absence of evolving solvents or other fluid by-products, the vinyl chloride resin particles entering into a solid solution with the plasticizer. This insures an image on the plate of high fidelity and produces a flexible plate which is adaptable for mounting on a rotary press or a flat bed press, the plate also having good wear properties and excellent ink receptivity.

In the practice of the method described in the above application, certain provisions must be made in order to accomplish highly acceptable results. Care must be taken to avoid entrapment of air bubbles within the image interstices of the matrix surface when the liquid is cast, and also between the liquid and the applied backing sheet. Also, the assembly is held under substantial pressure until the liquid has solidified and cooled in order to produce good adhesion between the facing and backing layers, and also to insure a uniform thickness. It will be apparent that the property of uniform thickness is essential, and a final control is preferably provided by grinding the back of the plate in a manner similar to that used in the manufacture of electrotype plates. However, the compression of the assembly in some cases tends to cause movement of the backing material in relation to the more liquid facing, producing ripples in the facing which in turn result in printing defects that are not removed by grinding.

It is a principal object of this invention to provide an apparatus for the manufacture of a uniformly superior quality of printing plate of accurate gauge with relatively little skill on the part of the operator, minimizing the possibility of air entrapment and ripples in the image.

Another object is to provide simplified, low-cost apparatus suitable for carrying out the process, whereby the manufacture of printing plates from matrices can be performed at low cost.

With the foregoing and other objects hereinafter appearing in view, the features of the invention reside in an apparatus whereby a matrix supported upon a platen is moved beneath a gauging member maintained in accurately spaced relationship to the surface of the platen, while a sheet of plate backing material is continuously fed with the matrix under the gauging member and an excess quantity of facing liquid is cast upon the face of the matrix, whereby the gauging member applies a force to the backing sheet to spread the liquid therebeneath and to distribute it in such a manner as to provide a constant total thickness of material in the combined structure.

In another embodiment of this invention a quantity of facing liquid is distributed and cast upon the face of and into the depressions of a matrix supported on a platen and the liquid partially fused to a solid state by the application of heat. The matrix supported on the platen is then moved beneath a gauging member maintained in accurately spaced relationship to the surface of the platen, while a sheet of plate backing material is continuously fed with the matrix under the gauging member and a quantity of liquid is cast upon the face of the matrix containing the solid facing liquid in the character forming recesses or depressions of the matrix. In this manner the gauging member applies a force to the backing sheet to spread the liquid binder therebeneath and to distribute it in such a manner as to provide a constant total thickness of material in the combined structure.

Figure 2:
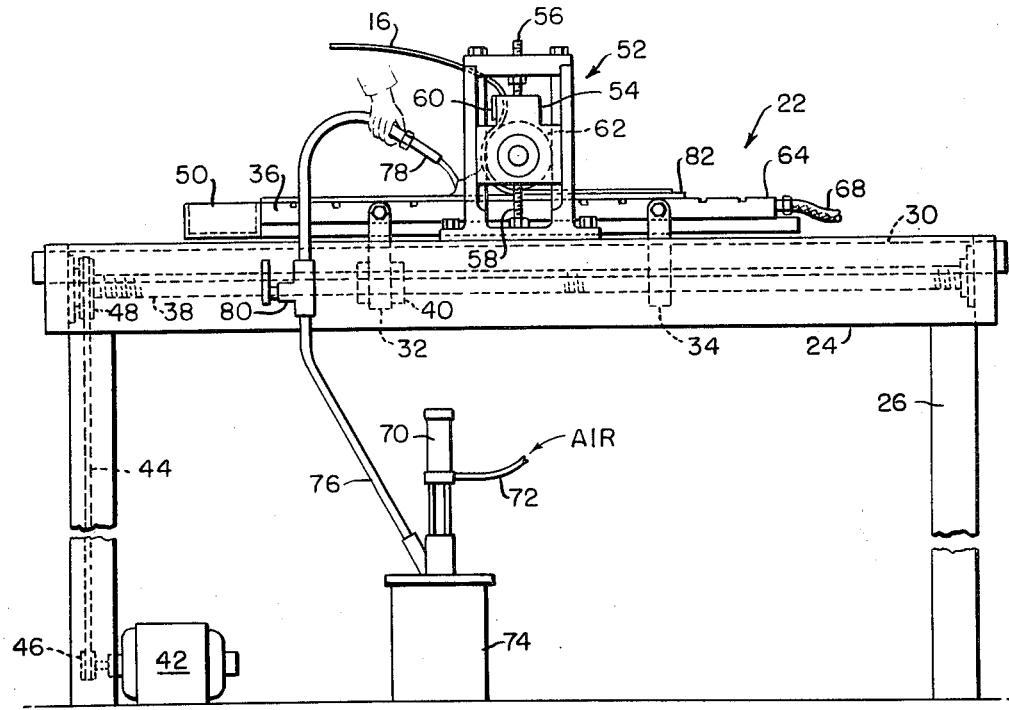
Figure 3:
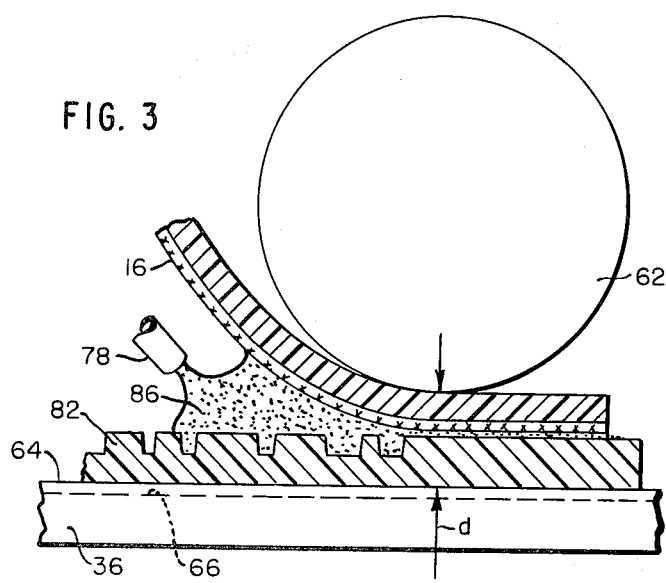
Figure 4:
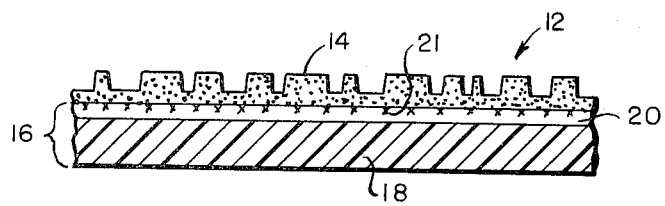
Figure 5:
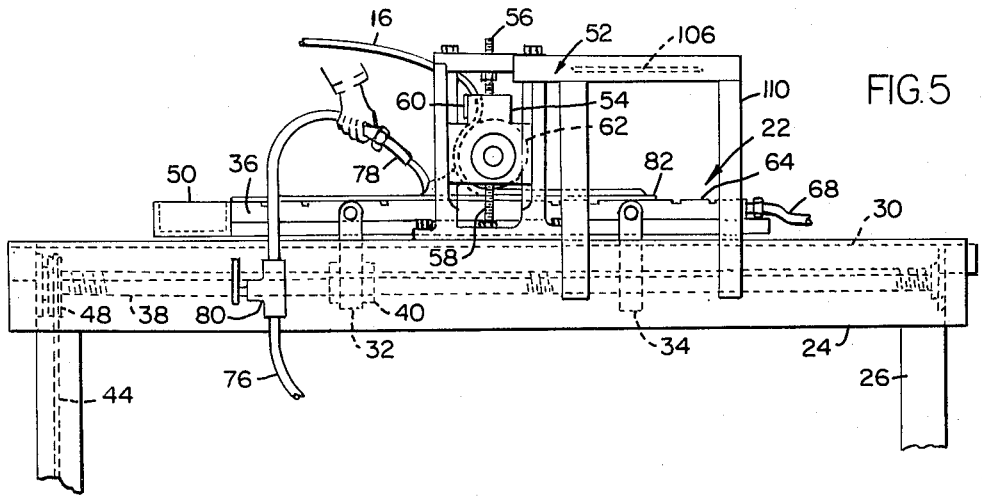
Figure 6:
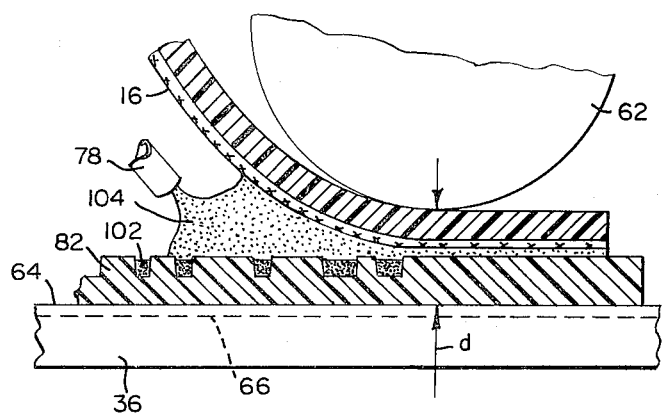
Figure 7:
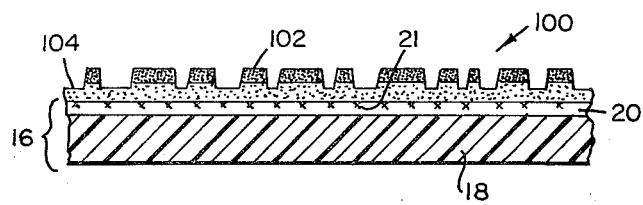

Other features of the apparatus herein disclosed for the practice thereof reside in certain details of construction, modes of operation and processes, steps and techniques that will be more fully understood from the following description having reference to the appended drawings, wherein FIG. 1 is a plan view of the plate making apparatus;
FIG. 2 is a side elevation of said apparatus;
FIG. 3 is a fragmentary detail view of the molding liquid being cast upon the matrix; and
FIG. 4 is a fragmentary sectional elevation of the finished printing plate.
FIG. 5 is a side elevation of a modified apparatus;
FIG. 6 is a fragmentary detail view of a liquid material being cast upon a matrix containing solidified facing material in the matrix depressions; and
FIG. 7 is a fragmentary sectional elevation of a finished printing plate containing preformed printing characters.

Referring to FIG. 4, the finished plate 12, which is the product resulting from the practice of this invention, comprises an integral composite body consisting of a plastic facing layer 14 having the desired flexibility, resiliency, sharp and faithful definition, wear resistance and ink receptive properties, and a backing 16 of plastic composition comprising the bulk of the plate. This backing may consist of a single layer of material, but it preferably comprises at least two layers, a grindable layer 18 which may be a plastic having a substantial content of frangible filler, e.g. 30 to 60 percent by volume, and a resilient layer 20 consisting of a plastic material that will impart the proper resilient qualities to the plate to prevent undue wear during repetitive printing cycles. The grindable layer may be composed of vinyl chloride resin with frangible filler material of wood flour, diatomaceous earth, glass or phenolic beads and the like dispersed therein, while the resilient layer may consist of a conventional vinyl chloride resin of the desired hardness with or without a web of unoriented fiber such as glass fiber therein or bonded thereto. The layer 20 preferably has imbedded near its upper surface a sheet 21 of random oriented matted glass fibers for reinforcing and dimensionally stabilizing the plate in the region immediately beneath the facing layer 14. The plate may be ground on the back as described in said application for final thickness control.

The layers 14, 18 and 20 are preferably fabricated of plastisol and are of varying hardness depending on the desired properties discussed above. In the practice of the present invention the backing 16, comprising the layers 18 and 20 with the imbedded sheet 21, is preferably preformed as an integral, fully fused sheet. This sheet is fed to the apparatus for molding the facing layer 14 thereto, as shown in FIGS. 1 and 2. The apparatus, designated generally at 22, is provided with a rigid frame 24 standing upon legs 26. The frame has end members 28 in which rigid ways 30 are secured. These ways consist of solid round bars slidably supporting a pair of yokes 32 and 34. The yokes are bolted to a platen 36 having an accurately ground flat upper surface to receive the negative matrix. A threaded lead screw 38 rotatably secured in the end members 28 passes through the yokes 32 and 34 and is threaded in a sleeve 40 on the yoke 32 to transmit a driving force to the platen. A motor 42 is provided with a belt 44 and pulleys 46 and 48 for driving the lead screw.

A liquid collecting pan 50 is secured to the end of the platen 36 in position to receive excess liquid at the end of a molding cycle as discussed more fully below.

A pair of rigid bearing frames 52 are bolted to the frame members 24, and each slidably supports a bearing block 54 which is accurately located in the vertical direction by means of a pair of adjustment screws 56 and 58. A flat metal bar 60 is secured between the blocks 54 to provide a guide for the backing sheet 16.

A rigid roll 62 having its surface ground to an accurate cylindrical shape is rotatably supported on an accurately determined adjustable axis in the bearing blocks 54, and the screws 56 and 58 are adjusted with great accuracy to maintain a uniform distance between the roll surface and the upper surface 64 of the platen throughout the length of the roll, this distance remaining constant at all points as the platen moves progressively, from left to right as illustrated, beneath the roll. A single plate is cast on each such movement, following which the matrix with the plate assembled upon it is removed from the machine.

The platen 36 is preferably a vacuum chuck provided with intersecting channel grooves 66, a hose connector 68 being provided for connection to a vacuum pump.

A pump for facing liquid is provided with a hole 72 connected with a source of air pressure, and delivers the liquid from a container 74 through a hose 76 to a hand-held nozzle 78. A suitable valve 80 is provided in the hose 76. The nozzle 78 may be mechanically supported above the platen if desired, and more than one nozzle may be used for simultaneous delivery of liquid.

The process for molding a printing plate is commenced by placing a matrix 82 upon the platen to the left of the bite of the roll. A vacuum is applied to the hose 68 to hold the matrix firmly in position throughout the plate molding operation. If desired, a quantity of the facing liquid may next be poured upon the matrix and scrubbed by means of a bristle brush into the recesses of the image. However, for many plates, especially those having type matter in the larger print sizes, this step may be omitted.

The motor 42 is then energized to cause the platen 36 to move at a uniform speed beneath the roll 62. The roll is preferably mounted on ball bearings so as to turn freely about its axis with minimum frictional drag. As shown in FIG. 3, a bite of constant thickness "d" is defined between the surface 64 of the platen and the nearest surface of the roll. The dimension "d" is slightly greater than the sum of the maximum thickness of the matrix and the thickness of the backing sheet 16.

As the matrix and the sheet 16 are drawn under the bite, facing liquid 86 is directed through the nozzle 78 between them. A puddle of the facing liquid is formed and caused to advance in relation to the matrix, with the pressure of the bite forcing it uniformly into all depressions in the image. The puddle of liquid is maintained in excess of the quantity required to fill the matrix, whereby the excess at the end of the operation is allowed to flow into the collecting pan 50.

It will be noted that the bite defined by the dimension "d" determines precisely the amount of facing liquid between the matrix and the backing sheet at every point. This liquid is the exact amount required to cause the assembly comprising the matrix, the backing sheet and the facing material to be of constant thickness throughout its width and length. The bite produces this desired result through the continuous application of pressure due to the fact that an excess quantity of facing liquid is disposed upon the matrix adjacent thereto and must be squeezed out as the matrix advances under the roll 62. This action minimizes the possibility of trapping air bubbles and assures close contact between the backing sheet and the facing liquid, whereby the facing layer will adhere to the backing sheet without the subsequent application of pressure.

After the foregoing operations, the matrix is released from the vacuum chuck and placed in an oven maintained at a temperature sufficient to fuse the plastisol and cause it to be bonded permanently to the backing sheet. As indicated above, in this step and during the subsequent cooling the assembly is not subjected to compression. During heating it is preferably carried into the oven upon rollers with the backing sheet uppermost and subjected to a recirculating stream of hot air. The facing liquid is preferably a plastisol which fuses at a temperature in the range of approximately 300° to 350° F., and the oven is preferably maintained at a temperature within this range. After cooling, the finished plate is peeled from the matrix and is in condition for grinding, although it will be found that less grinding is needed than with plates made by earlier methods.

Referring to FIG. 7, another finished plate 100 which is the product resulting from the practice of another embodiment of this invention is similar to plate 12 previously described but comprises preformed solid facing characters 102 in the facing layer which may be of the same or different material or of greater hardness than the material 104 between and bonded to the backing sheet 16 and the facing layer. For example, the facing characters may be a vinyl chloride resin of a higher degree of hardness than the vinyl chloride resin material employed to interconnect the preformed character to permit enhanced durability and independent flexing of the printing characters in use. Further, the facing characters 102 may be preformed using a heat hardenable or curable material such as a thermosetting phenolic resin or hard rubber with the material 104 chosen to form a good bond between the facing characters and the backing sheet. Plastic printing plates of the type shown in FIG. 7 may be prepared by including means to at least partially fuse or solidify the facing material 102 and/or the heat hardenable bonding material 104, while the composite structure is supported on the platen.

Referring to FIG. 5, the apparatus previously described is shown in modified form to include at the one end, or right hand side of the roller 62, means to heat a heat hardenable liquid cast into the depressions of the matrix 82 which is supported on the platen 36, whereby the liquid is heated to a solid form. The heating means includes a plurality of infra-red quartz bulb units 106, e.g., four or five or more depending upon the width of the matrix 82 to be heated, and which units are disposed within a bulb housing, which includes reflective shields and polished aluminum to direct the heat energy of the bulb units downwardly onto the surface of the matrix and to provide uniformity of heating over the entire area of the matrix. The bulb units are supported on a frame 110 secured to the apparatus with the bulb units disposed at a sufficient height above the surface of the platen 36 and matrix 82, so that heat energy is uniformly distributed on the surface of the matrix. The bulb units are connected to a suitable source of electric power not shown, and switch means are provided to control their operation.

In operation, a facing liquid 102, such as a vinyl chloride resin plastisol hardenable to a solid having a hardness of at least 60 on the shore durometer D scale, is cast into the depressions of the matrix 82 to at least cover the bottom of the depressions and preferably to fill the depressions about one-half or more with the facing liquid. The matrix 82 supported on the platen 36 is then moved to the right, and beneath the infra-red bulb units 106, and the units switched on for a period of time sufficient to cause the facing member to partially fuse into a somewhat tacky solid form. The matrix 82 and the platen 36 are then moved back to the left side of the roller 62 and a liquid material 104 such as a vinyl chloride resin plastisol, hardenable to a solid form of greater flexibility than material 102, distributed by nozzle 78 between the backing sheet 16 and the partially fused solid material 102 in the depressions of the matrix 82, as shown in FIG. 6. If desired, a plastisol which is hardenable into the solid composition of the grindable layer 18 may be employed as the material 104. The process as previously described with FIGS. 1–4 is then repeated with the passage of the backing sheet 16 in excess liquid material 104 under the roller 62 providing an accurately gauged composite structure. The printing plate structure 100 is then again beneath the infra-red bulbs 106 and may again be heated to effect a partial fusing of the liquid material 104 or the matrix 82 may be released from the platen or vacuum chuck 36 and placed in an oven to complete the fusion process removed to cool, and the finished plate 100 peeled from the matrix 82. In a continuing operation the matrix 82 will retain sufficient residual heat from the fusion of the facing material so that some fusion and thickening of the binder material 104 occurs during the formation of the composite structure. The composite structure may then be placed in an oven to complete the fusion process.

Although the specific use of infra-red quartz bulbs has been described with the modified apparatus, it is of course apparent that any means of heating the matrix supported on the platen may be used such as the use of electrical heating resistance wires above or in the platen, or by the introduction of steam into conduits in the platen or vacuum chuck. For example, it is contemplated that the vacuum chuck may be heated by the introduction of steam into steam conduits followed by the introduction of cold water to cool the vacuum chuck during the second step of the operation.

It will be observed that a plate of uniformly controlled thickness is provided by the foregoing process and apparatus, irrespective of the nature of the image, whether half-tone, text, line drawings, mixed, or having large solid black or solid white areas, due to the action of the bite and the spreading of the huddle of facing liquid. Where the plate has particularly fine depressions as in some half-tone work, it may be desired to employ additional means or process steps to insure complete penetration and filling of the depressions by the liquid. Ultrasonic vibration of the nozzle 78, especially when supported in close relation to the puddle and the surface of the matrix, facilitates such filling. Also, a straight blade in the nature of a doctor blade may be placed in the puddle of facing liquid in advance of the bite and caused to vibrate at a controlled high frequency, with the same object.

It will be evident that other modifications or variations in the apparatus may also be employed, in accordance with techniques familiar to one skilled in this art, without departing from the spirit or scope of this invention.

Having thus described the invention, I claim:

1. An apparatus for the manufacture of plastic printing plates which apparatus comprises in combination: a rigid frame; ways on the frame; a vacuum chuck supported on and adapted for reciprocating movement on the ways, the vacuum chuck characterized by having a one end and another end and having an accurately ground flat upper surface adapted to receive and to hold a printing relief matrix; an upright frame secured transversely to the rigid frame; a cylindrical roll adapted for free rotation about and supported on an accurately positioned axis secured to the upright frame, the roll characterized by a smooth surface and accurate cylindrical shape whereby upon the rotation of the roll a constant distance is maintained between the surface of the roll and the upper surface of the vacuum chuck beneath the roll; means to apply a vacuum to the chuck to hold a relief matrix thereto; means to drive the vacuum chuck on the ways at a uniform and constant speed under the cylindrical roll; means to feed a backing sheet under the roll and into the space between the roll and the upper surface of the vacuum chuck and into frictional engagement with the roll surface; means to feed an excess of a facing liquid onto the relief matrix held on the vacuum chuck and to form a puddle of facing liquid between the backing sheet and the relief matrix, whereby as the vacuum containing the relief matrix passes beneath the roll the backing sheet is fed beneath the roll distributes and forces the facing liquid from the puddle into the relief matrix and the backing sheet is placed in close and firm contact with the constant thickness facing liquid on the relief matrix, the backing sheet being fed and the roll rotated by the uniform speed of the vacuum chuck as it passes beneath the cylindrical roll.

2. The apparatus of claim 1 which includes heating means to provide heat energy to the relief matrix on the chuck whereby a liquid heat hardenable material on the relief matrix may be changed into solid form.

3. An apparatus for the manufacture of plastic printing plates which apparatus comprises in combination: a rigid frame; ways on the frame; a vacuum chuck supported on and adapted for reciprocating movement on the ways, the vacuum chuck characterized by having a one end and another end and having an accurately ground flat upper surface adapted to receive and to hold a printing relief matrix; an upright frame secured transversely to the rigid frame; a cylindrical roll adapted for free rotation about and supported on an accurately positioned axis secured to the upright frame, the roll characterized by a smooth surface and accurate cylindrical shape whereby upon the rotation of the roll a constant distance is maintained between the surface of the roll and the upper surface of the vacuum chuck beneath the roll; means to adjust the axis of the roll so that the distance between the surface of the roll and the upper surface of the vacuum chuck can be accurately postioned; means to apply a vacuum to the chuck to hold a relief matrix thereto; means to drive the vacuum chuck on the ways at a uniform and constant speed under the cylindrical roll; means to feed a backing sheet under the roll and into the space between the roll and the upper surface of the vacuum chuck and into frictional engagement with the roll surface; means to feed an excess of a facing liquid onto the relief matrix held on the vacuum chuck and to form a puddle of facing liquid between the backing sheet and the relief matrix; and means at the other end of the vacuum chuck to collect excess facing liquid after the vacuum chuck has passed beneath the roll whereby as the vacuum containing the relief matrix passes beneath the roll the backing sheet is fed beneath the roll distributes and forces the facing liquid from the puddle into the relief matrix and the backing sheet is placed in close and firm contact with the constant thickness facing liquid on the relief matrix, the backing sheet being fed and the roll rotated by the uniform speed of the vacuum chuck as it passes beneath the cylindrical roll.

4. The apparatus of claim 3 wherein the ways are round bars and the apparatus includes yokes slidably mounted on the ways and secured to the vacuum chuck and a uniformly threaded lead screw member passing through the yoke and rotatably secured to the frame whereby a uniform and constant driving force is transmitted to the vacuum chuck.

5. The apparatus of claim 3 wherein the means to feed a facing liquid includes a container for the facing liquid, a nozzle, a conduit from the container to the nozzle and an air pump in fluid communication with the nozzle whereby air is employed to force the facing liquid in the container through the conduit and to the nozzle.

6. The apparatus of claim 3 which includes at the one end of the apparatus infra-red heating means positioned above the surface of the vacuum chuck whereby heat energy from said infra-red heating means may be directed towards the surface of the relief matrix so that a liquid heat hardenable material may be changed into a solid form.

References Cited by the Examiner
UNITED STATES PATENTS

| | | | |
|---|---|---|---|
| 374,065 | 11/1887 | Heaton | 18—5 |
| 401,729 | 4/1889 | Benedict et al. | 18—5 |
| 644,810 | 3/1900 | Sylvester | 18—1 |
| 2,781,545 | 2/1957 | Vollak | 18—5 |

WILLIAM J. STEPHENSON, *Primary Examiner.*